United States Patent
Mahmoud et al.

(10) Patent No.: US 12,110,872 B2
(45) Date of Patent: Oct. 8, 2024

(54) METHOD FOR DE-ICING AT LEAST ONE ROTOR BLADE OF A WIND POWER INSTALLATION

(71) Applicant: Wobben Properties GmbH, Aurich (DE)

(72) Inventors: Muhanad Mahmoud, Aurich (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/343,468

(22) Filed: Jun. 28, 2023

(65) Prior Publication Data

US 2024/0003336 A1    Jan. 4, 2024

(30) Foreign Application Priority Data

Jun. 30, 2022  (EP) .................................. 22182350

(51) Int. Cl.
*F03D 7/00*  (2006.01)
*F03D 7/02*  (2006.01)
*F03D 80/40*  (2016.01)

(52) U.S. Cl.
CPC .......... *F03D 80/40* (2016.05); *F03D 7/0276* (2013.01); *F03D 7/028* (2013.01); *F05B 2270/32* (2013.01); *F05B 2270/323* (2013.01); *F05B 2270/325* (2013.01)

(58) Field of Classification Search
CPC ........ F03D 80/40; F03D 7/0276; F03D 7/028; F05B 2270/32; F05B 2270/323; F05B 2270/325
See application file for complete search history.

(56) References Cited

U.S. PATENT DOCUMENTS

| | | | | |
|---|---|---|---|---|
| 7,086,834 B2* | 8/2006 | LeMieux | .................. | F03D 7/02 416/37 |
| 8,039,980 B2* | 10/2011 | Mizoue | .................. | F03D 80/40 290/55 |
| 2003/0106683 A1* | 6/2003 | Klotten | ..................... | F02G 5/02 165/283 |

(Continued)

FOREIGN PATENT DOCUMENTS

| CN | 111852793 A | 10/2020 |
|---|---|---|
| DE | 102010015595 A1 | 10/2011 |

*Primary Examiner* — Matthew T Largi

(74) *Attorney, Agent, or Firm* — Seed IP Law Group LLP

(57) ABSTRACT

Method for de-icing at least one rotor blade of a rotor of a wind power installation, wherein the rotor is able to be operated at a variable rotating speed and the wind power installation generates an output from wind, said method comprising the following steps: checking for an icing situation on the at least one rotor blade, and changing from a normal operation of the wind power installation without de-icing to a de-icing operation if an icing situation has been identified; wherein in the de-icing operation the at least one rotor blade is heated for de-icing, and the rotating speed and/or the generated output are/is reduced as a function of at least one environmental condition of the wind power installation; wherein the at least one environmental condition is selected from the list including an external temperature of the wind power installation and a wind speed in the region of the wind power installation.

17 Claims, 3 Drawing Sheets

(56) References Cited

U.S. PATENT DOCUMENTS

| | | | |
|---|---|---|---|
| 2011/0089692 A1* | 4/2011 | Girardin | F03D 7/0264 290/44 |
| 2013/0106108 A1* | 5/2013 | De Boer | F03D 7/045 290/44 |
| 2014/0091572 A1* | 4/2014 | Jepsen | F03D 7/026 290/44 |
| 2015/0118047 A1* | 4/2015 | Yoon | F03D 7/044 416/61 |
| 2016/0084231 A1* | 3/2016 | Runge | F03D 7/00 416/1 |
| 2017/0226990 A1* | 8/2017 | Arlaban Gabeiras | F03D 1/06 |
| 2021/0372375 A1* | 12/2021 | Schaper | F03D 7/04 |
| 2022/0186714 A1* | 6/2022 | Messing | F03D 80/40 |
| 2022/0389913 A1* | 12/2022 | Becker | F03D 80/40 |

\* cited by examiner

METHOD FOR DE-ICING AT LEAST ONE ROTOR BLADE OF A WIND POWER INSTALLATION

BACKGROUND

Technical Field

The invention relates to a method for de-icing at least one rotor blade of a rotor of a wind power installation. The invention likewise relates to a wind power installation for carrying out such a method.

Description of the Related Art

It is a known issue in wind power installations that the rotor blades can be subject to icing. The phenomenon is more frequent particularly in very cold regions or at high altitudes. Therefore, heating systems are habitually used to heat the rotor blades. The ice formed on the rotor blade is to be thawed as a result and/or a formation of ice is to be prevented.

Situations in which so much ice has already formed that thawing is no longer possible may arise time and again in the process. In particular, in these instances, the heating output of the heating system may be insufficient for making thawing possible. The wind power installation is usually shut down in such cases and the ice is potentially thawed later while the wind power installation is stopped.

This has the disadvantage that no output is generated in the time during the stoppage, and no output can be fed to the grid.

Heating systems of wind power installations are usually characterized by a minimum ambient temperature up to which complete de-icing of the rotor blades can be guaranteed during normal operation. De-icing can no longer be guaranteed if the ambient temperature drops below this minimum temperature so that the wind power installation is shut down.

BRIEF SUMMARY

One or more embodiments provided are techniques for improving the heating of a rotor blade so as to avoid or thaw any formation of ice in order to avoid the shutting down of the wind power installation. The intention is to at least find an alternative to solutions known to date.

A proposed method relates to de-icing at least one rotor blade of a rotor of a wind power installation. The rotor is able to be operated at a variable rotating speed, and the wind power installation generates an output from wind.

The method here comprises the steps of checking for an icing situation on at least one rotor blade and changing from a normal operation of the wind power installation without de-icing to a de-icing operation if an icing situation has been identified.

In the de-icing operation the at least one rotor blade is heated for de-icing, and the rotating speed and/or the generated output is reduced as a function of at least one environmental condition of the wind power installation. The at least one environmental condition may be an external temperature of the wind power installation and/or a wind speed in the region of the wind power installation.

It has been recognized that the approach flow velocity on the rotor blade at lower rotating speeds of the rotor is also lower than at higher rotating speeds. A reduced approach flow velocity leads to the heat loss when heating the rotor blade being likewise reduced. As a result, the efficiency factor of the heating system is also increased so that the de-icing conditions can be changed by the reduced rotating speed with the environmental condition being unchanged. More ice can be thawed in particular.

It is likewise possible for the generated output to be reduced in order to increase the efficiency factor of the heating system.

It has been recognized in particular that aerodynamically unfavorable situations can be avoided by reducing the output. For example, icing can lead to a change in the actual profile of the rotor blade so that an operating point which is actually provided for the prevailing wind situation is no longer suitable and may therefore lead to stalling. Reducing the output can in this instance lead to less stalling on the rotor blade.

A reduction in the output can result from an altered rotating speed/output characteristic curve, wherein the rotating speed/output characteristic curve defines a correlation between the detected rotating speed and the delivered output to be set to this end. A simultaneous reduction in the output and in the rotating speed can result here, or such a simultaneous reduction is proposed, respectively.

The icing situation comprises ice accumulated on the rotor blade as well as conditions which facilitate icing of the rotor blade.

The worse the icing situation, the more ice is formed on the rotor blade, and the more the rotating speed and/or the generated output can be reduced. The reduction here takes place as a function of the environmental condition so that the rotating speed is further reduced if the temperature continues to drop, for example.

In the de-icing operation, a departure from an optimal operating point by way of which the wind power installation is operated in the normal operation thus takes place. In the de-icing operation, an operating point in which the rotating speed and/or the generated output are/is lower than in the normal operation as a function of the environmental condition is consciously chosen. The reduction of the rotating speed already has the effect that this may result in a reduction of the generated output, as has been explained above in the context of the rotating speed/output characteristic curve. Depending on the environmental condition and icing situation occurring, this is advantageous because a shutdown can be avoided. Instead of having to shut down or not being able to generate any output at all, an output which by virtue of the reduction of the rotating speed is potentially lower in the de-icing operation in comparison to the normal operation is thus tolerated.

The at least one environmental condition here is determined in the region of the wind power installation. The environmental condition is preferably determined in the region of a nacelle of the wind power installation, in particular in the region of the rotor blade.

If the external temperature of the wind power installation is determined and used as the environmental condition, the rotating speed and/or the generated output is reduced further, the lower the external temperature. The reduction of the rotating speed and/or output here can take place in steps or continuously.

Furthermore, the reduction of the rotating speed and/or output in the de-icing operation as a function of the wind speed can also be provided.

The reduction of the rotating speed and/or output in the de-icing operation has thus the effect that a sub-optimal operating point is indeed chosen and less output can be generated than in the normal operation, but any shutdown of the wind power installation by virtue of the icing situation can be avoided.

According to a further aspect, the operation of the wind power installation is based on a rotating speed characteristic curve which defines rotating speed values to be set as a function of the wind speed. Furthermore, a normal rotating speed characteristic curve is used in the normal operation, and a reduced rotating speed characteristic curve is used in the de-icing operation, wherein the reduced rotating speed characteristic curve in comparison to the normal rotating speed characteristic curve has reduced rotating speed values pertaining to the same respective wind speed values.

A correlation between the wind speed and the rotating speed to be set is defined by using a rotating speed characteristic curve. The reduced rotating speed characteristic curve is defined for reducing the rotating speed, and as a result a reduced rotating speed value can be stored and implemented for each wind speed. It is avoided as a result that a new reduced rotating speed has to be found again for each new wind speed in the event of fluctuating wind speeds. As a result of the reduced rotating speed characteristic curve, reduced rotating speed values which the wind power installation can implement in a simple way and in the usual manner are available for all wind speeds.

If an icing situation is thus identified, the reduced rotating speed characteristic curve is used as a function of the environmental condition, in particular as a function of the external temperature as the environmental condition. A plurality of reduced rotating speed characteristic curves may be stored, so that the rotating speed can be further reduced in the event of changing environmental conditions, in particular changing external temperatures, in that a new reduced rotating speed characteristic curve is defined, the latter in comparison to the normal rotating speed characteristic curve having further reduced rotating speed values pertaining to the same respective wind speed values.

A dual dependency may arise here, in which the rotating speed characteristic curve as a function of the wind speed is chosen on the one hand, while the selected rotating speed characteristic curve per se alters the rotating speed as a function of the wind speed. In this case it can be provided in particular that a reduced rotating speed characteristic curve is in each case selected for a wind speed range, but the rotating speed characteristic curve remains unchanged within the wind speed range, and the rotating speed is set only so as to correspond to the selected rotating speed characteristic curve. The reduced rotating speed characteristic curve is preferably only selected not as a function of the wind speed but as a function of the external temperature.

Constant repeat feedback controlling, or defining a new reduced rotating speed, in the event of fluctuating wind speeds can be avoided by using the reduced rotating speed characteristic curve, respectively. A threshold above which the reduced rotating speed characteristic curve is used in the de-icing operation can be defined for the at least one environmental condition. For example, if the external temperature drops below a previously determined threshold, the reduced rotating speed characteristic curve is used in the de-icing operation. The rotating speed to be set can thus be determined as a function of the wind speed by means of the rotating speed characteristic curve used as a basis.

According to a further aspect, the wind power installation is controlled by an operational characteristic curve. The operational characteristic curve sets a system state to be set as a function of a detected rotating speed, wherein the system state to be set is the output to be generated or a generator torque to be set. A normal operational characteristic curve is used in the normal state, and an operational characteristic curve with a reduced rotating speed is used in the de-icing operation. The operational characteristic curve with a reduced rotating speed in comparison to the normal operational characteristic curve has higher values of the system state to be set pertaining to the same respective rotating speed values.

The operational characteristic curve can thus be a rotating speed output characteristic curve or a rotating speed torque characteristic curve. The operational characteristic curve with a reduced rotating speed is thus used in the de-icing operation so as to reduce the rotating speed as a function of the environmental condition. In an analogous manner, the operational characteristic curve with a reduced rotating speed is selected as a function of the at least one environmental condition in order to achieve a desired reduction of the rotating speed. As a result, controlling the wind power installation is easy to implement in that controlling takes place by means of the operational characteristic curve independently of the icing situation and the environmental condition. It is only the operational characteristic curve used as a basis that changes in the de-icing operation.

It can be provided here too that the operational characteristic curve is selected not as a function of the wind speed but as a function of the external temperature.

According to a further aspect, the rotating speed in the de-icing operation is reduced more, the lower the external temperature and/or the higher the wind speed. Alternatively or additionally, the generated output in the de-icing operation is reduced more, the lower the ambient temperature and/or the higher the wind speed.

The further the drop in the external temperature, the more the rotor blade is cooled and the more heating output is required for de-icing the rotor blade, or for preventing icing, respectively. Likewise, an increased wind speed leads to a higher flow velocity on the rotor blade and to a higher heat loss. More heating output would thus be required at higher wind speeds in order to thaw ice formed on the rotor blade. The reduction of the rotor rotating speed leads in particular to a reduced air speed on the rotor blade and thus to reduced cooling. In this way, the increased cooling as a result of the lower external temperature and/or as a result of the higher wind speed can be counteracted. Additionally or in combination therewith, a better operating point can be set by reducing the output, said better operating point counteracting increased cooling of the rotor blade as a result of the lower external temperature and/or as a result of the increased wind speed.

The rotating speed and/or the output can in particular also be reduced in that a new reduced rotating speed characteristic curve and/or operational characteristic curve with a reduced rotating speed are/is defined. For example, if the external temperature drops below a first defined threshold, a first reduced rotating speed characteristic curve and/or operational characteristic curve with a reduced rotating speed are/is used. If the external temperature drops further and sinks below a second defined threshold, a second reduced rotating speed characteristic curve and/or a second operational characteristic curve with a reduced rotating speed are/is used. The second reduced rotating speed characteristic curve in comparison to the first reduced rotating speed characteristic curve and in comparison to the normal rotating speed characteristic curve has in this case reduced rotating speed values pertaining to the same respective wind speed values. Furthermore, the second operational characteristic curve with a reduced rotating speed in comparison to the first operational characteristic curve with a reduced rotating speed and in comparison to the normal operational characteristic curve has higher values of the system state to be set pertaining to the same respective rotating speed values.

According to a further aspect, in the normal operation, the wind power installation is operated at a rotating speed which is referred to as the normal rotating speed and is a function of the wind speed. In the de-icing operation, the wind power installation is operated at a reduced rotating speed. The reduced rotating speed at the same respective wind speed is set lower than the normal rotating speed. A quotient of reduced rotating speed over normal rotating speed at the same respective wind speed is preferably lower, the higher the normal rotating speed. Moreover or alternatively, the reduced rotating speed decreases as the wind speed increases, while the normal rotating speed increases as the wind speed increases.

In the de-icing operation, the rotating speed is thus reduced relative to the normal rotating speed in the normal operation. As a result, the wind speed is indirectly taken into account by way of the normal rotating speed. It is thus utilized here that an operating point at which the wind power installation would be operated in the normal operation can be determined in a known manner. This includes that the normal rotating speed is determined. As a function of the associated normal rotating speed determined in this way, the reduced rotating speed can then be set in the de-icing operation.

It is taken into account here that this results in a high normal rotating speed by virtue of a high wind speed, and a high flow velocity prevails on the rotor blade. In order to reduce the flow velocity and to increase the heating effectiveness, the rotating speed is thus reduced more, the higher the normal rotating speed.

It has been recognized in particular that it is advantageous for a quotient of reduced rotating speed over normal rotating speed at the same respective wind speed to be chosen lower, the higher the normal rotating speed. It is achieved as a result that higher reduction of the rotating speed is carried out, the higher the wind speeds. As a result, a high approach flow velocity at the rotor blade, which is caused by a high wind speed, can be at least partially compensated for by a correspondingly high reduction of the rotating speed.

Moreover or alternatively proposed is a control in which the reduced rotating speed decreases as the wind speed increases, while the normal rotating speed increases as the rotating speed increases. As a result, it can be avoided even in the event of an increasing wind speed that the approach flow velocity is increased. Such an increase can at least be severely restricted.

According to a further aspect, in the de-icing operation, if an absence of ice on the rotor blade has been identified, the de-icing operation with heating of the at least one rotor blade is continued, the rotating speed is increased, in particular to an intermediate rotating speed, and/or a set heating output is reduced.

It has been recognized here that thawing may require more heating output than keeping the blade free of ice. Moreover, it has been recognized that it is expedient to thaw a rotor blade as fast as possible so that said rotor blade thereafter has its aerodynamic profile again. It is therefore proposed that a high heating output is applied for thawing. However, as soon as thawing has taken place, the heating may nevertheless continue in order to prevent icing from reoccurring. It has been recognized, however, that a lower heating output may be sufficient to this end.

When ice has been thawed but heating is continued for avoiding a new formation of ice, in particular at a reduced heating output, the rotating speed can be increased again because increased cooling as a result of an increase of the approach flow velocity at the blade is acceptable. However, an increase to an intermediate rotating speed which is a reduced rotating speed in comparison to the normal operation preferably takes place here.

According to a further aspect, for reducing the rotating speed as a function of the at least one environmental condition, a reduced rotating speed value as the reduced maximum rotating speed is defined. The rotating speed is set to this reduced maximum rotating speed or to a lower value. In particular if the wind power installation is operated in an operation with a restricted rotating speed, in which a restricted rotating speed is defined independently of the de-icing operation, and the restricted rotating speed is lower than the reduced maximum rotating speed, the wind power installation is operated at the restricted rotating speed, and a heating output is reduced.

It has been recognized here that rotating speeds which are above the reduced maximum rotating speed lead to an excessively high approach flow velocity at the rotor blade, in which so much heat is dissipated that the rotor blade cannot be thawed, or can be at least poorly thawed, or cannot be kept free of ice, respectively. For this reason, the rotating speed should not be above the reduced maximum rotating speed but may be below the latter.

It has been recognized in particular that, by defining a reduced maximum rotating speed, conflicts with other feedback controls which likewise provide a reduction in the rotating speed are avoided. For instance, it can occur that the wind power installation has already to be operated in an operation with a reduced rotating speed and at a restricted rotating speed by virtue of further parameters set for the wind power installation, for example for limiting noise emission. Parameters which relate to the safety of the wind power installation are also considered. The rotating speed is thus already reduced by virtue of other parameters set for the wind power installation and may be below the reduced maximum rotating speed. In this case, the approach flow velocity is already lower than would be necessary for keeping the rotor blade free of ice or for de-icing the latter at the full heating output. A lower heating output would be sufficient. The heating output is therefore reduced in order to save energy.

According to a further aspect, the reduction of the rotating speed and/or the generated output in the de-icing operation is chosen as a function of a degree of icing. The rotating speed and/or the generated output are/is more heavily reduced as the degree of icing increases.

The degree of icing thus indicates how much ice has been formed on the rotor blade. In this case, there may be a differentiation between no ice, a little ice, and a lot of ice, for example. However, finer classifications are also conceivable. In particular, a mean ice thickness can be detected and be used as a yardstick for the degree of icing.

The degree of icing can be determined by measurement or computation, for example. To this end, sensors for determining an ice thickness on the rotor blade can be used. Likewise, the degree of icing can be determined in that an actually generated output is reconciled with a generated output to be expected as a function of the wind speed. The degree of icing can be estimated depending on how much the expected output and the generated output deviate from one another.

According to a further aspect, provided in the de-icing operation is a maximum rotating speed which is lower than a nominal rotating speed of the wind power installation. The rotating speed is thus restricted to a lower rotating speed, i.e., the maximum rotating speed. This maximum rotating speed would not be attained at low wind speeds, and the wind power installation can be normally operated in principle. It has been recognized that there is only weak cooling by the wind at low wind speeds anyway, and a reduction of the rotating speed may therefore be superfluous.

However, the usual operational management would lead to an increase of the rotating speed at higher wind speeds, which may lead to excessive cooling of the rotor blades. The maximum rotating speed prevents precisely this. The maximum rotating speed is thus also the rotating speed which is set in the de-icing operation when a nominal wind speed has been reached.

According to a further aspect, in a partial-load operation, when the wind speed is below a nominal wind speed, the rotating speed increases as the wind speed increases. The wind speed dependent increase in the de-icing operation has a smaller gradient than in the normal operation. Alternatively or additionally, in the de-icing operation, the wind speed dependent increase has a smaller gradient, the higher the degree of icing and/or the lower the external temperature.

For aerodynamic reasons, the rotating speed is fundamentally increased as the wind speed increases in the partial-load operation. A wind power installation can in particular be conceived such that a constant tip speed ratio is pursued in the partial-load operation, wherein the tip speed ratio indicates the ratio between the revolving speed of the rotor and the wind speed. It has however been recognized here that, for reducing the cooling output of the rotor blades by the air flow, the rotating speed in the de-icing operation should not increase so heavily along with the wind speed.

It is proposed in particular that the wind power installation is operated such that the tip speed ratio in the de-icing operation decreases as the wind speed increases.

It has moreover been recognized that a correspondingly higher degree of icing impedes thawing, and that this may be counteracted by a correspondingly lower rotating speed, at least by a rotating speed that increases at a correspondingly lower rate.

The same has been identified for a correspondingly lower temperature, which likewise impedes thawing.

According to a further aspect, in the de-icing operation in a partial-load operation, for reducing the rotating speed and/or the generated output, an angle of attack of the at least one rotor blade is altered. Alternatively or additionally, in a full-load operation, for reducing the rotating speed, a generator torque is increased. This is preferably achieved by increasing an excitation of a generator rotor.

By adjusting the angle of attack, specifically in the direction towards the feathered position, the rotor can extract correspondingly less output from the wind. As a result, the output can be reduced and also the rotating speed can be reduced. This adjustment of the angle of attack in the de-icing operation is carried out in the partial-load operation, while no adjustment of the angle of attack is usually carried out in the normal operation.

An adjustment of the angle of attack usually takes place in the full-load operation anyway in order to restrict the output extracted from the wind. A further adjustment of the angle of attack can also lead to a reduction of the output extracted from the wind, which is also proposed here. A further reduction of the rotating speed can likewise be achieved in this way. It has however been recognized that an additional or improved measure for reducing the rotor rotating speed, and thus also the output, lies in increasing the generator torque. The rotor is decelerated as a result, this resulting in a reduction of the rotating speed and consequently the output.

It has been recognized here that the wind power installation in the full-load operation is usually already operated at the nominal torque, which would actually preclude any further increase, as an increase of the generator torque beyond the nominal torque could lead to damage to the generator. It has however also been recognized that such potential damage to the generator in most instances has thermal causes, there thus being the risk of overheating. It has however been recognized that overheating is less problematic in the de-icing operation and overtorquing beyond the nominal torque is less critical. When using an externally excited synchronous generator, the increase of the generator torque can also take place by increasing an excitation of the rotor. An excitation current would also be increased beyond an otherwise usual limit, this however being acceptable for thermal reasons in the de-icing operation.

According to a further aspect, in the de-icing operation, the rotating speed and/or the generated output are/is reduced as a function of at least one supplementary environmental condition. The following supplementary environmental conditions are considered: An amount of precipitation in the region of the wind power installation, an air humidity in the region of the wind power installation, a droplet or particle size of precipitation in the region of the wind power installation, and a temperature gradient of an external temperature over a height in the region of the wind power installation.

The supplementary environmental conditions are thus considered in addition to the external temperature and wind speed, and it can thus be determined more exactly whether the heating output in a current operation of the wind power installation is sufficient for thawing the rotor blade or keeping the latter free of ice, or whether the situation is to be improved by further reducing the rotating speed and/or the output.

In this context it has been recognized that precipitation, in particular rain, can lead to additional cooling of a rotor blade and may also increase the formation of ice. Precipitation can thus have an influence on the effectiveness of the heating of a rotor blade. In this context it has moreover been recognized that the amount of precipitation, which can be measured in mm, for example, as well as a droplet size, in the case of rain, or a particle size, in the case of snow, is relevant. It has been recognized that smaller droplet sizes or particle sizes provide less intense cooling and contribute less towards the formation of ice than larger droplet sizes or particle sizes, respectively.

Similar findings have been recognized in terms of the air humidity. If the latter is high, the cooling output of the wind is stronger and ice can form more easily or more intensely than in the case of a lower air humidity, thus when the air is drier.

It has likewise been recognized that a temperature gradient in relation to the height, thus different temperatures of the air at different heights, can influence icing and/or de-icing. Modern wind power installations have rotor diameters in the range of 150 m, so that the tip of a rotor blade in one revolution passes through corresponding altitudes. If the temperatures at these heights are very different, said blade tip is imparted corresponding temperature fluctuations while revolving. Such temperature fluctuations can facilitate the formation of ice and thus impede de-icing. It is therefore proposed that this is considered as a criterion.

According to a further aspect, in the de-icing-operation, checking for an icing situation is repeated. Checking is preferably repeated in each case after a checking time has elapsed. The rotating speed and/or the output are/is set in each case as a function of an icing situation identified in the process.

Checking for the icing situation, and the reduction of the rotating speed and/or the output associated therewith, is thus an adaptive or even iterative procedure. For example, if it is identified after the checking time has elapsed that the reduction of the rotating speed has already achieved the desired effect and there is no ice present on the rotor blade, the rotating speed is increased again if the environmental conditions permit the latter. If the rotor blade continues to be free of ice, the normal operation can thus be re-attained in steps. In contrast, if it is established that the icing situation has changed and ice is being formed, this can be counteracted by reducing the rotating speed and/or the output.

The rotating speed is thus repeatedly reduced or increased again only to the extent that the rotor blade remains free of ice. This adaptive method is proposed in particular when sensors for identifying the icing situation, thus for measuring the ice thickness, for example, are additionally used. A reliable result of the icing situation can be determined by the measurement, and the rotating speed can be optimally adapted, i.e., reduced only to the extent as is required for keeping the rotor blade free of ice.

If the icing situation changes by virtue of changing environmental conditions, the method readjusts the rotating speed.

According to a further aspect, changing to the de-icing operation takes place when the external temperature drops below a first temperature limit value. Changing back to the normal operation takes place when the external temperature increases above a second temperature limit value. The second temperature limit value here is above the first temperature limit value. The first and/or the second temperature limit value are/is preferably defined as a function of the wind speed and/or of at least one supplementary environmental condition.

As a result of the second temperature limit value being above the first temperature limit value, a hysteresis behavior is achieved. It is avoided that the rotating speed and/or the output are/is constantly reduced and subsequently increased should the first and the second temperature limit value coincide to form a common temperature limit value and the external temperature fluctuate about such a common temperature limit value. Instead, the rotating speed and/or the output are/is increased again, and changing to the normal operation takes place, only when the external temperature increases beyond the second temperature limit value.

Moreover, icing is more probable as the wind speed increases while the external temperature remains the same. In the event of a higher wind speed but an external temperature that remains the same, the first and the second temperature limit value are thus preferably set higher so that changing back to the normal operation takes place later. Additionally or moreover, taking into account at least one supplementary environmental condition is advantageous for more exact determination.

Here too, the following supplementary environmental conditions are considered: An amount of precipitation in the region of the wind power installation, an air humidity in the region of the wind power installation, a droplet or particle size of precipitation in the region of the wind power installation, and a temperature gradient of an external temperature over a height in the region of the wind power installation. The effects of the supplementary environmental conditions have been described above and are relevant also in terms of the change between the normal operation and the de-icing operation.

According to a further aspect, a plurality of operational characteristic curves with a reduced rotating speed are used. At a definable upshift temperature changing preferably takes place in each case from an operational characteristic curve with a reduced rotating speed and of a lower rotating speed reduction to an operational characteristic curve with a reduced rotating speed and of a higher rotating speed reduction. At a definable downshift temperature changing takes place in each case back to the operational characteristic curve with a reduced rotating speed and of a lower rotating speed reduction. The downshift temperature is in particular higher than the upshift temperature so that a hysteresis behavior results when changing. Alternatively or additionally, the upshift temperature and/or the downshift temperature are defined as a function of the wind speed and/or of at least one second environmental condition.

A downshift temperature thus describes or denotes a temperature limit value. If the latter is reached in the event of a falling temperature, specifically an external temperature, thus reached from above, changing takes place from a first operational characteristic curve with a reduced rotating speed to a second operational characteristic curve with a reduced rotating speed. The first operational characteristic curve with a reduced rotating speed controls the wind power installation such that a lower rotating speed results than in the normal operation at the same respective wind speed, but a higher rotating speed results in comparison to the second operational characteristic curve with a reduced rotating speed.

Accordingly, the upshift temperature describes or denotes a further temperature limit value. If the latter is reached in the event of an increase in temperature, specifically an external temperature, thus reached from below, changing takes place from the second operational characteristic curve with a reduced rotating speed to the first operational characteristic curve with a reduced rotating speed, thus as in the case of the downshift temperature but in reverse.

By changing from the operational characteristic curve with a reduced rotating speed and of a lower rotating speed reduction to the operational characteristic curve with a reduced rotating speed and of a higher rotating speed reduction it is thus achieved that the rotating speed is further reduced, but the wind power installation at any one time is controlled only by means of one operational characteristic curve. In order for the rotating speed to be altered, a new operational characteristic curve is thus defined by the change instead. Controlling of the wind power installation in a simple manner thus continues to be guaranteed.

In order to avoid constant changing, for example in the case of the external temperature fluctuating about the downshift temperature, changing back to the operational characteristic curve with a reduced rotating speed and of a lower rotating speed reduction takes place only when the external temperature reaches the higher upshift temperature.

Proposed is moreover a wind power installation having a rotor which is adjustable in terms of rotating speed and has at least one rotor blade. The wind power installation has a heating system for heating the at least one rotor blade. The wind power installation is specified to carry out a method for de-icing the at least one rotor blade according to one of the preceding aspects.

To this end, the wind power installation preferably has a control unit on which the method is implemented. The wind power installation also has a checking installation for checking for an icing situation. The method is carried out as a function of the result of the checking installation.

Proposed according to a further aspect is a wind power installation which has at least one measuring installation for measuring at least one environmental condition. The measuring installation is attached to a nacelle, the rotor, and/or a tower of the wind power installation. Alternatively or additionally, the measuring installation, in particular a temperature sensor for measuring the external temperature, is attached to the at least one rotor blade.

BRIEF DESCRIPTION OF THE SEVERAL VIEWS OF THE DRAWINGS

The method implemented on the control unit is carried out as a function of the measured values of the at least one environmental condition recorded in the measuring installation.

DETAILED DESCRIPTION

Figure 1:
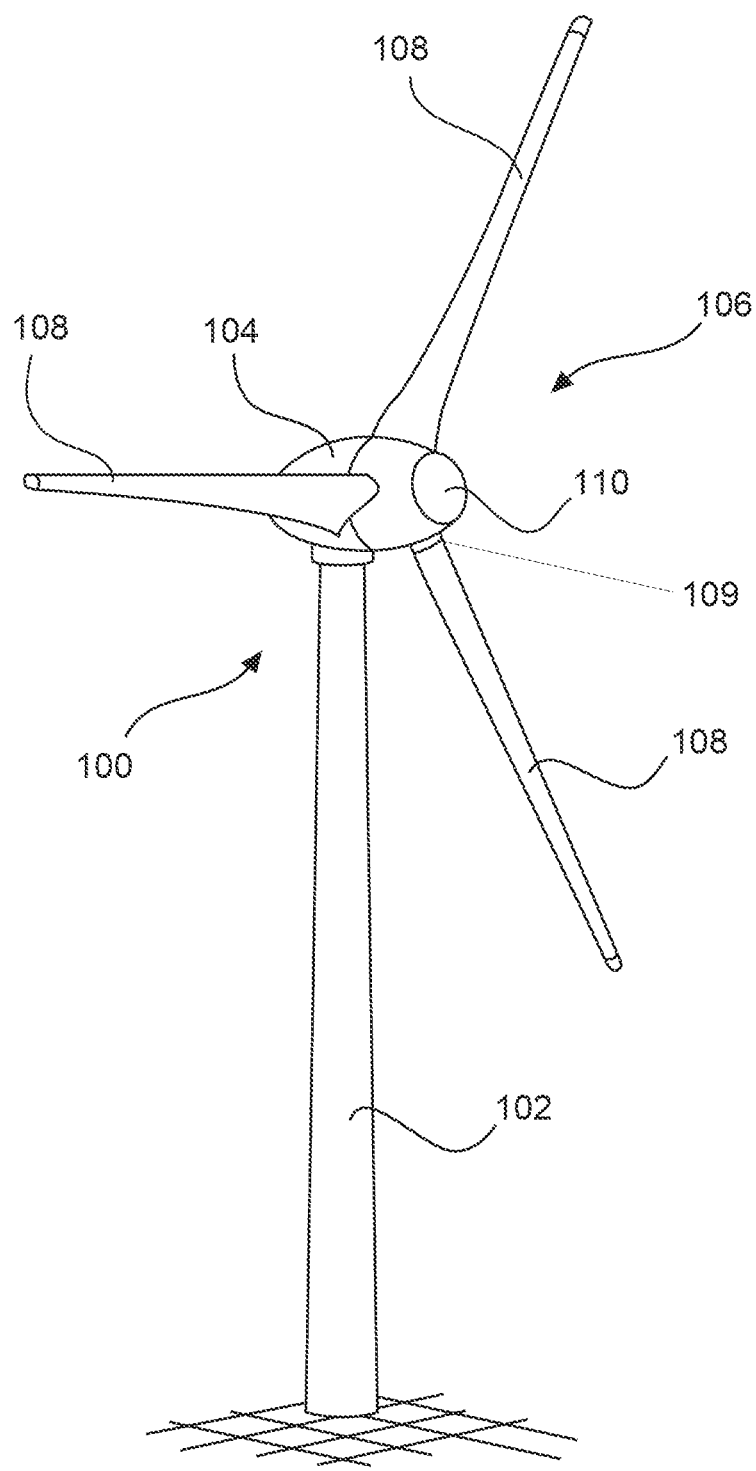
FIG. 1 shows a wind power installation in a perspective view.

FIG. 1 shows a schematic illustration of a wind power installation according to the invention. The wind power installation 100 has a tower 102, and a nacelle 104 on the tower 102. An aerodynamic rotor 106 having three rotor blades 108 and a spinner 110 is provided on the nacelle 104. In the operation of the wind power installation the aerodynamic rotor 106 is set in a rotating movement by the wind and thus also rotates an electrodynamic rotor of a generator which is coupled directly or indirectly to the aerodynamic rotor 106. The electric generator is disposed in the nacelle 104 and generates electric power. The blade angles of the rotor blades 108, which may synonymously also be referred to as pitch angle or adjustment angle, can be altered by pitch motors at the rotor blade roots 109 of the respective rotor blades 108. The wind power installation includes one or more computing system or computing device including a computer, a processor, microprocessor, and/or controller.

Figure 2:
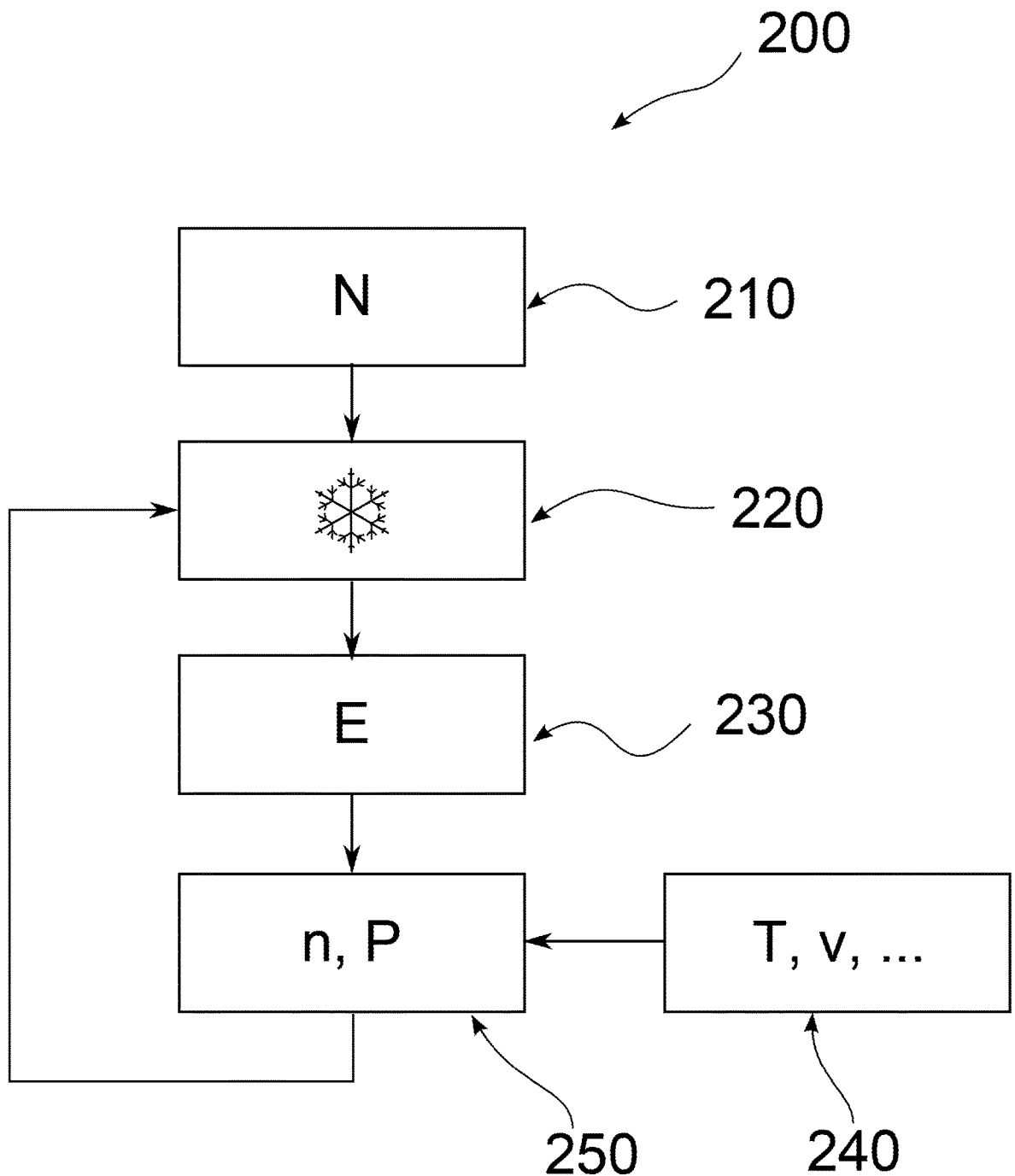
FIG. 2 shows a flow chart of a method for de-icing a rotor blade.

FIG. 2 shows a flow chart of a method 200 for de-icing a rotor blade of the wind power installation.

The wind power installation is generally operated in a normal operation 210.

In a checking step 220 it is checked whether an icing situation has been identified. In the process, it can be identified that ice has formed on the rotor blade as well as that the formation of ice appears to be probable. To this end, for example, an actually generated output can be compared with a generated output to be expected. If the deviation exceeds a predetermined limit value it is to be assumed that an icing situation is present. However, special sensors which measure an ice thickness on the rotor blade can also be used. Further customary methods for checking the icing situation are possible.

If it is identified in the checking step 220 that an icing situation is present, changing to a de-icing operation 230 takes place. In the de-icing operation, the rotor blade is heated for de-icing.

Furthermore, an environmental condition 240 is determined. In particular an external temperature in the region of the rotor blade. If it is now identified by virtue of the environmental condition that the heating output is insufficient for thawing the rotor blade, a rotating speed n of the rotor of the wind power installation is reduced in a reduction step 250.

The wind power installation would normally have to be shut down in the event of an insufficient heating output. However, by reducing the rotating speed it is possible for the approach flow velocity at the rotor blade to be decreased. As a result, a heat loss during heating of the rotor blade is minimized. In other words, the heating effectiveness is increased. The ice can thus continue to be thawed despite the heating output not being altered.

As a result of the reduced rotating speed, less output is indeed generated than would be possible at unaltered rotating speed, but it is avoided that the wind power installation has to be shut down by virtue of icing, so that the reduction of the rotating speed is nevertheless advantageous.

The rotating speed is thus reduced in the reduction step 250, for example when the external temperature drops below a defined value. This defined value here may per se be a function of the wind speed. The higher the wind speed, the more likely that the reduction of the rotating speed has the effect of decreasing the approach flow velocity at the rotor blade and thus of increasing the heating effectiveness.

In a next step, the checking step 220 for checking the icing situation is repeated after a checking time. If it is identified that the rotor blade is free of ice, changing back to the normal operation 210 can take place. The environmental conditions such as the external temperature and the wind speed are also taken into account in the process.

However, if it is identified that an icing situation continues to be present, there is still icing of the rotor blade, or icing is still probable, the wind power installation continues to be operated in the de-icing operation 230. The rotating speed n is then further reduced or optionally increased again in the reduction step 250, depending on the environmental condition 240.

In order to avoid aerodynamically unfavorable situations, the output P can additionally also be reduced in the reduction step 250. The actual profile of the rotor blade changes as a result of icing, such that an operating point provided for the ice-free operation is no longer suitable. The operating point is changed by the additional reduction of the output, and stalling on the rotor blade can be avoided.

Figure 3:
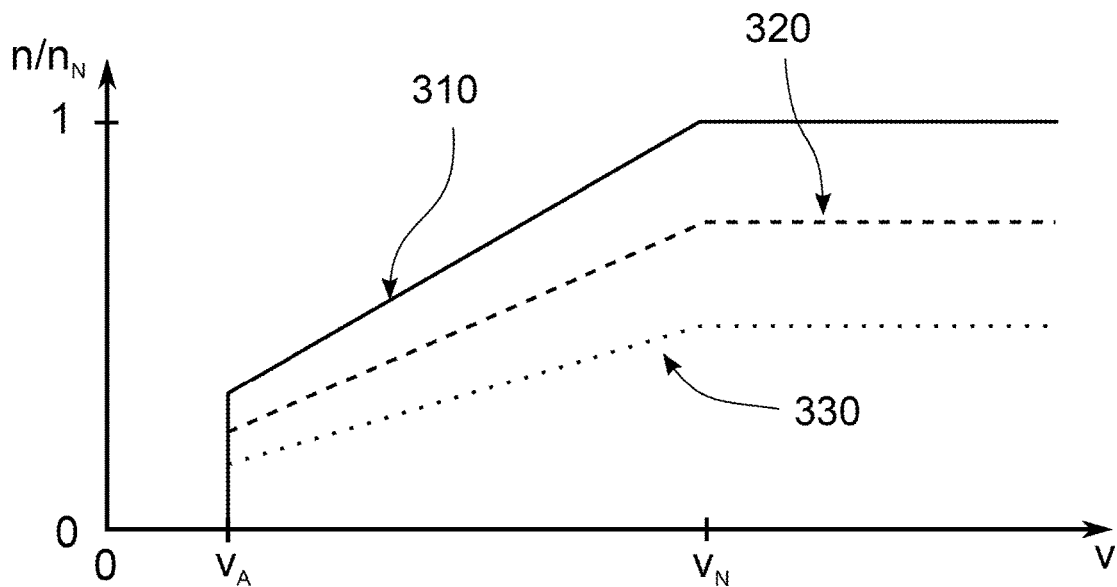
FIG. 3 shows a plurality of rotating speed characteristic curves.

FIG. 3 shows the profile of three rotating speed characteristic curves 310, 320, 330 which describe a correlation between the rotating speed n and the wind speed v. The rotating speed n here is standardized to a nominal rotating speed $n_N$ which during normal operation is set at the nominal wind speed $v_N$. The illustration is highly simplified and normally there is in particular no linear correlation between the wind speed and the rotating speed, but FIG. 3 serves only for the purpose of visualization.

Three degrees of icing are differentiated here. The rotating speed characteristic curve 310, illustrated by a solid line, describes the correlation in the case of an ice-free rotor blade, thus in the normal operation of the wind power installation. The rotating speed characteristic curve 320, illustrated by a dashed line, describes the correlation in the de-icing operation in the event of minor formation of ice on the rotor blade. The rotating speed characteristic curve 330 for the event of a heavy formation of ice on the rotor blade in the de-icing operation is illustrated by a dotted line.

It is common to the rotating speed characteristic curves 310, 320, 330 that the wind power installation can be operated only as from a start-up wind speed $v_A$, above which the rotating speed n is unequal to zero.

In the partial-load operation of the wind power installation, thus for wind speeds between the start-up wind speed $v_A$ and the nominal wind speed $v_N$, the rotating speed according to the rotating speed characteristic curves 310, 320, 330 increases at an increasing wind speed v.

In the full-load operation, as from the nominal wind speed $v_N$, the rotating speed n of the rotating speed characteristic curves 310 in the normal operation reaches the nominal rotating speed $n_N$. In the de-icing operation, thus according to the rotating speed characteristic curves 320, 330, a maximum rotating speed which is lower than the nominal rotating speed $n_N$ of the normal operation is achieved as from the nominal wind speed $v_N$.

In order for the rotating speed to be reduced in the de-icing step, a degree of icing is thus determined as a function of the external temperature, and a corresponding reduced rotating speed characteristic curve 320, 330 is selected. The lower the external temperature, the lower the rotating speed at a given wind speed.

Proposed here is a decrease in the gradient of the rotating speed characteristic curve in the partial-load range as the temperature sinks, or the degree of icing increases.

Figure 4:
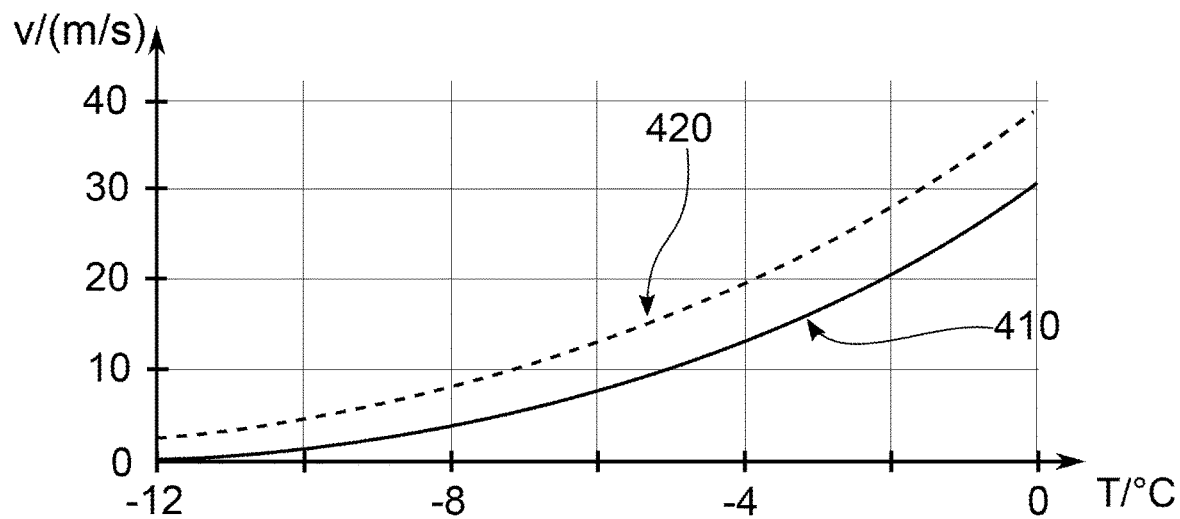
FIG. 4 shows an efficiency factor of a heating system.

It is illustrated in a coordinate system in FIG. 4 up to what wind speed v the rotor blade of the wind power installation can be thawed as a function of the external temperature T at different rotating speeds. This thus visualizes the effectiveness of a heating system for heating the rotor blades of the wind power installation at different rotating speeds of the rotor. Selected here by way of example is an excerpt for the temperature range from −12° C. to 0° C., and a wind speed range from 0 m/s to 40 m/s.

The curve 410, illustrated by a solid line, shows the case in which the wind power installation is operated in the normal operation, the rotor thus is operated at the normal rotating speed, but is nevertheless to be de-iced. The curve 420, illustrated by a dashed line, shows the case in which the wind power installation is operated in the de-icing operation at a reduced rotating speed. In the example, the reduced rotating speed of the curve 420 is chosen such that said rotating speed corresponds to 60% of the normal rotating speed.

The rotor blade is able to be thawed in operating situations which can be defined by a value pair of temperature and wind speed that lies below the curves 410, 420.

Both curves shown in FIG. 4 are based on the assumption that the heating system is operated at the full heating output. As a result of the reduced rotating speed in the de-icing operation, the approach flow velocity at the rotor blade is decreased so that the heating is possible in a more effective manner. As a result, it is possible for the rotor blade in the de-icing operation to be thawed up to higher wind speeds than in the normal operation, at the same external temperature. It is also derived therefrom that the rotor blade in the de-icing operation can be thawed up to lower external temperatures than in the normal operation, at the same wind speed.

The heating system in the de-icing operation according to the curve 420 can thus thaw the rotor blade more effectively than in the normal operation according to the curve 410. It is thus achieved by the reduced rotating speed that the ice can continue to be thawed, or can be more rapidly thawed, or thawed at all, respectively, and shutting down the wind power installation is avoided.

The following aspects are thus proposed or taken into account in particular:

Embodiments are directed to operating a wind power installation, which synonymously may also be referred to as a wind power plant and be abbreviated as WEA, under icing conditions in special operational settings that are adapted to the ambient temperature, thus the external temperature of the wind power installation.

Primarily, the rotor rotating speed is to be lowered at particularly low external temperatures at which complete de-icing of the rotor blade can no longer be guaranteed under normal operating parameters of a normal operation. As a result of the reduced rotating speed, a reduced heat dissipation takes place at the rotor blade, which has the effect that the rotor blade can continue to be kept free of ice. The advantage that the wind power installation does not have to be shut down by virtue of icing, but continues to be kept free of ice at a reduced rotating speed and is able to continue to operate, is derived as a result. The disadvantage of the reduction in the rotating speed lies in that the wind power installation can only deliver a reduced output. However, a reduced delivered output in the event of icing still offers significant economic advantages in comparison to the complete shutdown of the wind power installation.

The idea lies in reducing the output of the WEA under icing conditions, depending on the prevailing external temperature, rotating speed and wind speed; further parameters such as, for example, the amount of precipitation, air humidity, droplet size or particle size, temperature gradient, output data of the wind power installation or similar can optionally be used as feedback control parameters. In this way, complete icing can be prevented, and the wind power installation can continue to be operated at a reduced output even under icing conditions.

The method, when applied, permits the operation of wind power installations to be maintained even under icing conditions. The objective is the increase of the power yield in comparison to a wind power installation which is operated without the method described.

Embodiments are directed to operating a wind power installation under icing conditions while using special operational settings which are adapted to the ambient temperature. Primarily, the rotor rotating speed is to be lowered at particularly low external temperatures at which complete de-icing of the rotor blade can no longer be guaranteed under normal operating parameters of a normal operation. As a result of the reduced rotating speed, a heavily reduced heat dissipation results at the rotor blade, which has the effect that the rotor blade can be kept free of ice during operation at the same heating output. The advantage that the wind power installation does not have to be shut down by virtue of icing is derived as a result. The disadvantage of the reduction in the rotating speed lies in that the wind power installation can only deliver a reduced output. However, a reduced delivered output in the event of icing still offers significant economic advantages in comparison to the complete shutdown of the wind power installation.

The idea lies in reducing the rotating speed and optionally also the output of the wind power installation under icing conditions, depending on the prevailing external temperature, rotating speed and wind speed; further parameters such as, for example, the amount of precipitation, air humidity, droplet size or particle size, temperature gradient, output data of the wind power installation or similar can optionally be used as feedback control parameters. In this way, complete icing can be prevented and the wind power installation can continue to operate permanently.

Input variables for a solution include the wind speed, in particular the wind speed in the far field, the external temperature at the height of the hub, the air humidity, the amount of precipitation, and particle sizes or droplet sizes.

The variables to be feedback-controlled include the rotor rotating speed and the installation output. The rotor rotating speed is feedback-controlled by way of the pitch angle, which can synonymously also be referred to as the blade angle. Within the scope of the possibilities of the generator and the aerodynamic possibilities of the rotor blades, the installation output can be feedback-controlled by way of the excitation current.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
de-icing at least one rotor blade of a rotor of a wind power installation, wherein the rotor is able to be operated at a variable rotating speed and the wind power installation generates an output from wind, the de-icing comprising:
checking for an icing situation on the at least one rotor blade; and
changing from a normal operation of the wind power installation without de-icing to a de-icing operation when an icing situation has been identified;
wherein in the de-icing operation:
the at least one rotor blade is heated for de-icing; and
the rotating speed and/or the generated output are reduced as a function of at least one environmental condition of the wind power installation;
wherein the at least one environmental condition is selected from the list including:
an external temperature of the wind power installation; and
a wind speed in a region of the wind power installation
wherein in a partial-load operation, when the wind speed is below a nominal wind speed, the rotating speed increases as the wind speed increases, wherein:
the wind speed dependent increase in the de-icing operation has a smaller gradient than in the normal operation; and/or
in the de-icing operation, the wind speed dependent increase has a smaller gradient:
the higher a degree of icing; and/or
the lower the external temperature.

2. The method according to claim 1, wherein:
an operation of the wind power installation is based on a rotating speed characteristic curve which defines rotating speed values to be set as a function of the wind speed; and
a normal rotating speed characteristic curve is used in the normal operation, and a reduced rotating speed characteristic curve is used in the de-icing operation, wherein the reduced rotating speed characteristic curve in comparison to the normal rotating speed characteristic curve has reduced rotating speed values pertaining to the same respective wind speed values.

3. The method according to claim 1, comprising:
controlling the wind power installation by an operational characteristic curve which sets a system state to be set as a function of a detected rotating speed, wherein the system state to be set is the output to be generated or a generator torque to be set;
wherein a normal operational characteristic curve is used in the normal operation; and
wherein an operational characteristic curve with a reduced rotating speed is used in the de-icing operation;
the operational characteristic curve with the reduced rotating speed in comparison to the normal operational characteristic curve has higher values of the system state to be set pertaining to the same respective rotating speed values.

4. The method according to claim 1, wherein:
the rotating speed in the de-icing operation is further reduced, the lower the external temperature and/or the higher the wind speed; and/or
the generated output in the de-icing operation is further reduced, the lower the external temperature and/or the higher the wind speed.

5. The method according to claim 1, wherein:
in the normal operation, the wind power installation is operated at a rotating speed which is referred to as the normal rotating speed and is a function of the wind speed;
in the de-icing operation, the wind power installation is operated at a reduced rotating speed; and
the reduced rotating speed at the same respective wind speed is set lower than the normal rotating speed,
a quotient of reduced rotating speed over normal rotating speed at the same respective wind speed is lower, the higher the normal rotating speed; and/or
the reduced rotating speed decreases as the wind speed increases, while the normal rotating speed increases as the wind speed increases.

6. The method according to claim 1, wherein in the de-icing operation, if an absence of ice on the rotor blade has been identified, at least one of the following steps occur:
the de-icing operation with heating of the at least one rotor blade is continued;
the rotating speed is increased; and
a set heating output is reduced.

7. The method according to claim 1, wherein:
for reducing the rotating speed as a function of the at least one environmental condition, a reduced rotating speed value as the reduced maximum rotating speed is defined so that the rotating speed is set to this reduced maximum rotating speed or a lower value; and
if the wind power installation is operated in an operation with a restricted rotating speed, in which a restricted rotating speed is defined independently of the de-icing operation, and the restricted rotating speed is lower than the reduced maximum rotating speed,
the wind power installation is operated at the restricted rotating speed; and
a heating output is reduced.

8. The method according to claim 1, wherein:
the reduction of the rotating speed and/or the generated output in the de-icing operation is chosen as a function of the degree of icing; and
the rotating speed and/or the generated output are more heavily reduced as the degree of icing increases.

9. The method according to claim 1, wherein provided in the de-icing operation is a maximum rotating speed which is lower than a nominal rotating speed of the wind power installation.

10. The method according to claim 1, wherein in the de-icing operation:
in the partial-load operation, for reducing the rotating speed and/or the generated output, an angle of attack of the at least one rotor blade is altered; and/or
in a full-load operation, for reducing the rotating speed, a generator torque is increased by increasing an excitation of a generator rotor.

11. The method according to claim 1, wherein:
in the de-icing operation, the rotating speed and/or the generated output are reduced as a function of at least one supplementary environmental condition from the list including:
an amount of precipitation in the region of the wind power installation;
an air humidity in the region of the wind power installation;
a droplet or particle size of precipitation in the region of the wind power installation; and
a temperature gradient of an external temperature over a height in the region of the wind power installation.

12. The method according to claim 1, wherein:
in the de-icing operation, checking for an icing situation is repeated after a checking time has elapsed; and
the rotating speed and/or the output are set in each case as a function of the icing situation identified in the process.

13. The method according to claim 1, wherein changing to the de-icing operation takes place when the external temperature drops below a first temperature limit value; and
changing back to the normal operation takes place when the external temperature increases above a second temperature limit value;
wherein the second temperature limit value is above the first temperature limit value;
wherein the first and/or the second temperature limit value are defined as a function of the wind speed and/or of at least one supplementary environmental condition.

14. The method according to claim 1, wherein:
a plurality of operational characteristic curves with a reduced rotating speed are used;
at a definable upshift temperature changing takes place in each case from an operational characteristic curve with a reduced rotating speed and of a lower rotating speed reduction to an operational characteristic curve with a reduced rotating speed and of a higher rotating speed reduction;
at a definable downshift temperature changing takes place in each case back to the operational characteristic curve with the reduced rotating speed and of a lower rotating speed reduction;
the downshift temperature is higher than the upshift temperature so that a hysteresis behavior results when changing; and/or
the upshift temperature and/or the downshift temperature are defined as a function of the wind speed and/or at least one second environmental condition.

15. A wind power installation comprising:
a rotor with an adjustable rotating speed and at least one rotor blade,
a heating system for heating the at least one rotor blade; and
one or more computing devices configured to carry out the method according to claim 1.

16. The wind power installation according to claim 15, comprising at least one measuring installation for measuring at least one environmental condition; and
wherein the measuring installation is attached to a nacelle, the rotor, and/or a tower of the wind power installation.

17. The wind power installation according to claim 16, wherein the measuring installation is a temperature sensor attached to the at least one rotor blade and configured to measure an external temperature.

* * * * *